United States Patent [19]

Price et al.

[11] Patent Number: 4,488,405
[45] Date of Patent: Dec. 18, 1984

[54] MASTER CYLINDER ASSEMBLY FOR A VEHICLE HYDRAULIC BRAKING SYSTEM

[75] Inventors: Anthony G. Price, Acocks Green; Roy Campbell, Bromsgrove, both of England

[73] Assignee: Lucas Industries Limited, Birmingham, England

[21] Appl. No.: 306,401

[22] Filed: Sep. 28, 1981

[30] Foreign Application Priority Data

Oct. 2, 1980 [GB] United Kingdom ............... 8031822
Mar. 6, 1981 [GB] United Kingdom ............... 8107146

[51] Int. Cl.³ .............................................. F15B 7/00
[52] U.S. Cl. ..................................... 60/581; 60/589; 60/591
[58] Field of Search ................. 60/581, 585, 589, 591

[56] References Cited

U.S. PATENT DOCUMENTS 4,006,593 2/1977 Edwards ............................ 60/581
4,178,757 12/1979 Ketterling ......................... 60/581
4,231,224 11/1980 Edwards ............................ 60/581

FOREIGN PATENT DOCUMENTS

1122851 1/1962 Fed. Rep. of Germany ........ 60/589

Primary Examiner—Abraham Hershkovitz
Attorney, Agent, or Firm—Scrivener, Clarke, Scrivener and Johnson

[57] ABSTRACT

A master cylinder assembly comprising two separate master cylinders is disclosed. Pressure spaces of the master cylinders are interconnected through outlet passages and a transfer passage, and a transfer valve is housed within each outlet passage. When the master cylinders are inoperative both transfer valves are retained by yieldable spacers in intermediate positions in which a limited flow can take place through both valves in both directions. This prevents hydraulic fluid from being trapped in the transfer passage which otherwise might cause a fracture to occur upon expansion with temperature of the fluid. Each transfer valve comprises a valve member which is engageable with a seating. The yieldable spacers by which the valve members may be held away from the seatings may be the thickness of a film of hydraulic fluid therebetween. In another construction the yieldable spacers may be discrete resilient projections provided either on the seatings or on the valve members to hold the valve members away from the seatings.

12 Claims, 7 Drawing Figures

MASTER CYLINDER ASSEMBLY FOR A VEHICLE HYDRAULIC BRAKING SYSTEM

This invention relates to master cylinder assemblies for vehicle hydraulic braking systems of the kind in which separate master cylinders are connected by a transfer passage through which pressure spaces in the cylinders are in communication when the master cylinders are operated simultaneously, and communication between the pressure spaces is adapted to be cut-off by transfer valve means when a master cylinder is operated on its own.

In one known master cylinder assembly of the kind set forth the transfer valve means comprises normally closed spring-loaded one-way valves, each controlling communication between the transfer passage and a master cylinder, and the transfer valves are adapted to be opened by axial movement of pistons of the master cylinder in a brake-applying direction. Thus, in an inoperative position, the one-way valves are closed so that the pressure spaces are isolated from the transfer passage.

A disadvantage of this arrangement is that when the master cylinder assembly is mounted near the engine of a vehicle hydraulic fluid trapped in the transfer passage may expand with increase in temperature against the normally closed valves and cuase a burst.

In our U.S. Pat. No. 4,006,593 we have disclosed a master cylinder assembly of the kind set forth for a vehicle hydraulic braking system in which the transfer valve means is located in the transfer passage and comprises an unsprung valve member adapted to be urged into engagement with one of a pair of spaced valve seatings to cut-off communication between the pressure spaces when one master cylinder is operated on its own, and the unsprung valve member is adapted to be held in a neutral position spaced from both seatings when the master cylinders are operated simultaneously.

Since the valve member is unsprung there is no spring to fail or otherwise impede effective operation of the master cylinder assembly.

The construction disclosed in U.S. Pat. No. 4,006,593 is only applicable to assemblies in which the two master cylinders are disposed in a close proximity, suitably within a common housing and the transfer passage is sufficiently short in length for the valve member to be operated by both master cylinders.

It is often desirable, in order to facilitate installation within a limited space and in the most convenient positions, for the master cylinders to be separate from each other. In such an installation the transfer passage may be of substantial length and may be constituted by an external connection.

Due to the length of the transfer passage it is not possible to utilise a construction of transfer valve means similar to that of U.S. Pat. No. 4,006,593.

According to our invention in a master cylinder assembly of the kind set forth a transfer valve is located between the transfer passage and the pressure space of each master cylinder, and when the master cylinders are inoperative both transfer valves are retained by yieldable means in intermediate positions in which a limited flow can take place through both valves in both directions, operation of one master cylinder on its own causing its respective transfer valve to open fully with the pressure generated in the pressure space of that master cylinder acting through the transfer passage to close the other transfer valve thereby isolating the transfer passage from the pressure space of the other, then inoperative, master cylinder, and simultaneous operation of both master cylinders causing both transfer valves to open fully whereby both pressure spaces are placed in open communication through the transfer passage.

Providing a transfer valve between the transfer passage and each master cylinder enables the master cylinders to be installed at convenient spaced locations, being interconnected by the transfer passage which is of a suitable length. Providing a limited flow through both transfer valves when the master cylinders are inoperative prevents hydraulic fluid from being trapped in the transfer passage. This otherwise might cause a fracture to occur upon expansion with temperature of fluid within the passage.

Preferably each transfer valve comprises a valve seating in the body of the respective master cylinder, and a valve member for engagement with the seating.

The valve member may be unsprung and urged towards the seating under gravity when the master cylinder is in its inoperative position.

Alternatively the valve member may be urged towards the seating by a spring provided in the transfer passage.

When the master cylinder is in its inoperative position the valve member may be held away from the seating by yieldable means comprising only the thickness of a film of hydraulic fluid therebetween which is sufficient to define a leak path through the valve but the effect of which is readily overcome by pressurisation of the fluid in the pressure space of the other master cylinder which acts on the valve member to close the valve fully when the said other master cylinder is operated on its own.

In another construction the valve member may be held away from the seating by yieldble means comprising discrete resilient projections which are deformable to enable the valve member to engage fully with the seating when the valve member is subjected to the pressure of fluid in the pressure space of the other master cylinder when that master cylinder is operated on its own. In such a construction the projections may be integral with the seating which is conveniently constructed from an elastomeric material, suitably rubber. Alternatively the seating is plain and the valve member is adapted to be held away from it by discrete resilient projections provided on the valve member itself.

Preferably, a seal is provided on the valve member adjacent to the seating, and the resilient projections are integral with the seal. Where a spring is used to urge the valve member towards the seating, the fitted load of the spring must be insufficient to overcome the resilience of the integral projections.

The seal is conveniently constructed from an elastomeric material, suitably rubber.

Three embodiments of our invention are illustrated in the accompanying drawings in which.

Figure 1:
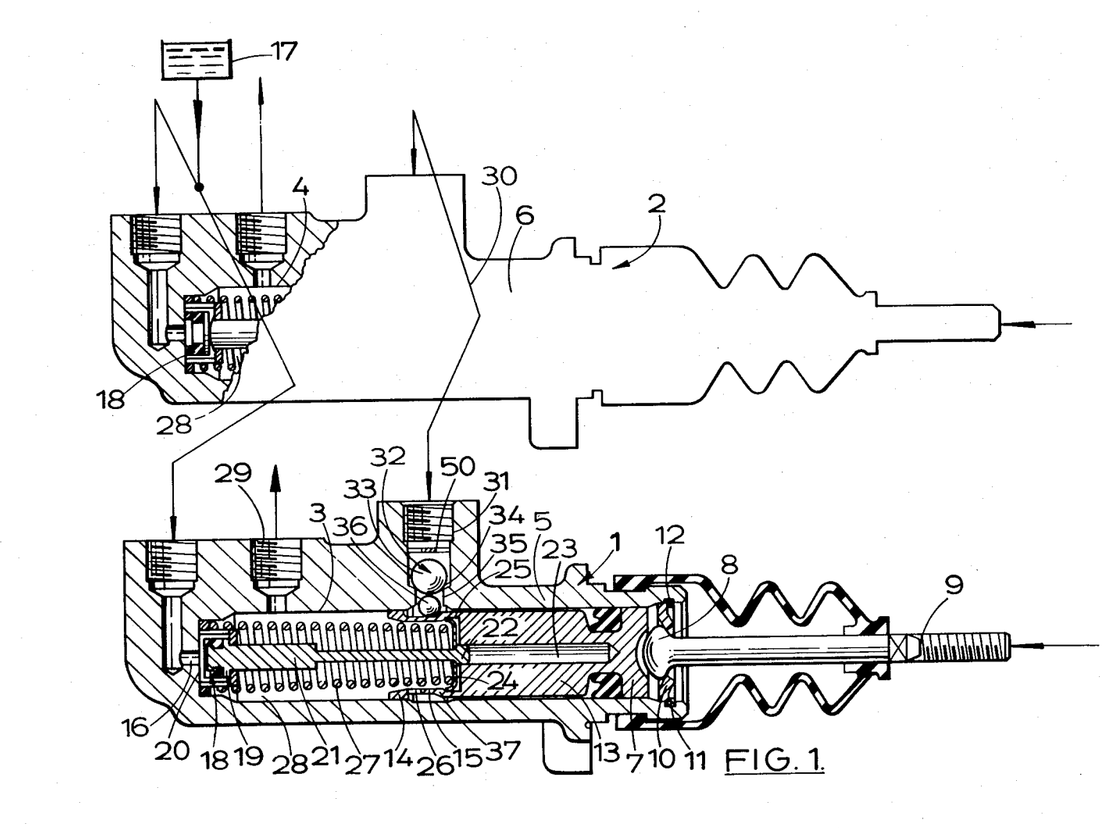
FIG. 1 is a part sectional side elevation of a dual master cylinder assembly.
Figure 2:
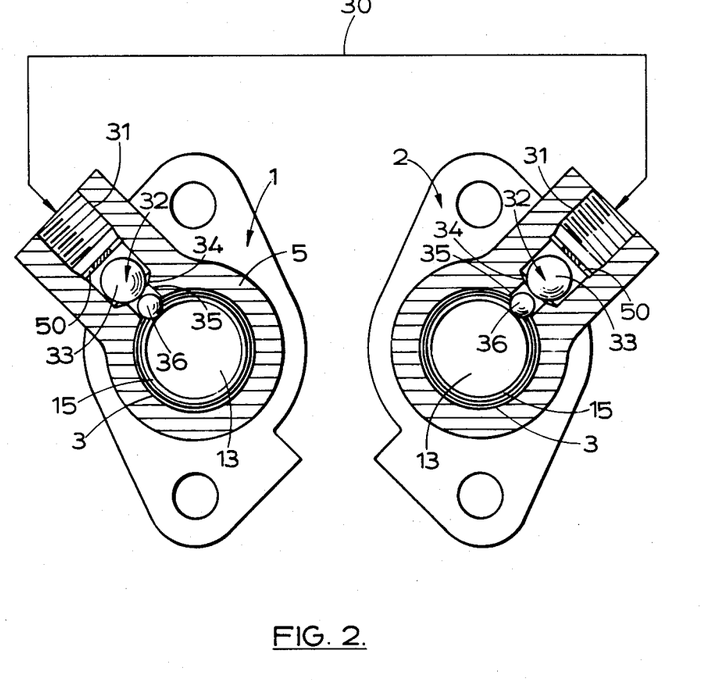
FIG. 2 is a transverse section through the transfer valves of the assembly of FIG. 1.

The dual hydraulic master cylinder assembly illustrated in FIGS. 1 and 2 of the drawings comprises two master cylinders 1, 2 formed by parallel bores 3, 4 each provided in a separate body 5, 6. The two bodies 5, 6 are identical in construction and can be installed in any convenient spaced locations in a vehicle.

As the two master cylinders are identical in construction, only one need be described.

A piston 7 working in the bore 3 is engaged at its rear end by a part-spherical head 8 on a pedal-operated push-rod 9. A stop for the head 8 is formed by an annular collar 10 located by a spring ring or circlip 11 received in an annular groove 12 in the bore 3.

The piston 7 is provided with a forward extension 13 of reduced diameter formed at its inner free end with an apertured flange 14 working in the bore 3. An annular recess 15 is located in the extension 13 to the rear of the flange 14.

A recuperation port 16 at the forward end of the body 5 for connection to a reservoir 17 for hydraulic fluid is controlled by a recuperation valve 18 comprising a head 19 for engagement with a seating 20 surrounding the port 16. The head 19 is carried by the forward end of an axially extending stem or rod 21 of which the opposite end carries an enlarged head 22 guided to slide in a longitudinally extending bore 23 in the adjacent end of the extension 13. The head 22 is retained within the bore 23 by a retaining plate 24 which, in turn, is retained in a groove 25 at the inner end of a bore 26 in the forward end of the extension 13. The plate 24 forms an abutment for one end of a compression return spring 27 of which the opposite end acts on a cage in which the head 19 is housed. In the position shown in the drawings the spring 27 urges the piston 7 into a retracted position in engagement with the collar 10 with the head 19 spaced from the seating 20 by the engagement of the plate 24 with the head 22.

a pressure space 28 defined in the bore 4 in front of the piston 7 is adapted to be connected to a vehicle brake through an outlet port 29. Normally the pressure space 28 of one master cylinder will be connected to brakes on one side of a vehicle, for example an agricultural tractor, and the pressure space of the other master cylinder will be connected to brakes on the opposite side of the tractor. Thus both master cylinders will be operated simultaneously to retard the vehicle, and independently for steering.

The two pressure spaces 28 of the master cylinders 1 and 2 are interconnected by a transfer passage comprising a pipe-line 30 which is connected at opposite ends to radial outlet passages 31 in the walls of the bodies 5 and 6.

The passages 31 extend upwardly from the bores 3, 4 when the master cylinders 1, 2 are installed in a vehicle in their positions of use.

A transfer valve 32 is housed within each passage 31, between the pressure space 28 and the transfer passage 30. Each transfer valve 32 comprises a valve member comprising a ball 33 which is unsprung and is engagable with a seating 34 formed by the material of the body 5. The seating comprises a shoulder 35 at a step in diameter at an intermediate point in the length of the passage 31. The seating 34 lies at an attitude such that the ball 33 can normally rest lightly against the seating 34 in a normal intermediate position but is held out of direct engagement with the seating 34 by a film of hydraulic fluid therebetween.

This defines a leak path so that a limited flow can take place through each valve 32 in a direction from the transfer passage 30 into the pressure spaces 28, to accommodate any effective increase in volume with heat of fluid in the transfer passage 30 between the two valves 32.

A thrust member 36 in the form of a ball is guided in a portion of the passage 31 surrounded by the shoulder 35 and, in the retracted position illustrated, the thrust member 36 is spaced from the ball 33 and is received in the recess 15.

When one of the master cylinders, say the master cylinder 1, is operated a short forward movement of the piston 7 with corresponding compression of the spring 27 is sufficient to cause the film of hydraulic fluid to yield and permit the head 19 to engage with the seating 20 to isolate the reservoir 17 from the pressure space 28. Simultaneously, or almost immediately thereafter, the piston 7 also urges the thrust member 36 inwardly by the engagement therewith of an inclined annular face 37 at the end of the recess 15 remote from the flange 14. This movement urges the valve member 33 away from the adjacent seating 34 in that body 5. Further movement of the piston 7 in the same direction causes fluid to flow through the transfer passage 30 through the open transfer valve which, in turn, creates a pressure drop across the ball 33 of the master cylinder 2 to urge it positively into engagement with the seating 34 in the body 6, overcoming the effect of the film of fluid which holds that valve in its intermediate position. Closure of the transfer valve 32 of the master cylinder 2 isolates the pressure spaces 28 of the master cylinders 1 and 2 from each other.

When the master cylinders are operated simultaneously the thrust members 36 both act in opposite directions to hold their respective balls 33 away from the seatings 34, so that the pressure spaces 28 are in free communication through the transfer passage 30 to compensate for differential wear of the linings of the brakes which the master cylinders 1 and 2 operate.

Figure 3:
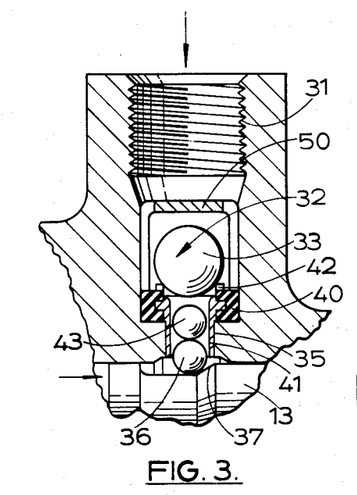
FIG. 3 is a section through a modified transfer valve with the valve in an intermediate position.
Figure 4:
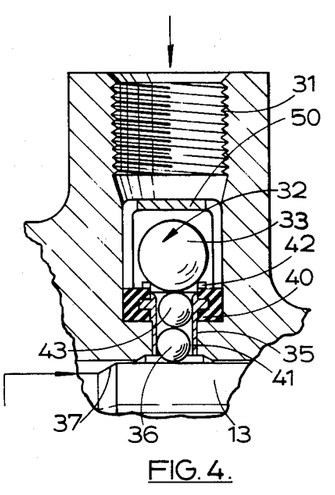
FIG. 4 is a section similar to FIG. 3 but showing the valve in a fully open position.
Figure 5:
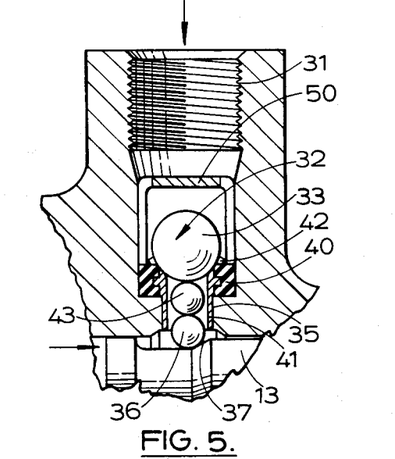
FIG. 5 is a section similar to FIG. 5 but showing the valve in a closed position.

In the modified transfer valve illustrated in FIGS. 3-5 of the accompanying drawings each transfer valve incorporates a seating 40 of elastomeric material, suitably rubber, which is retained against the outer face of the shoulder 35 by a retaining sleeve 41. The sleeve 41 prevents inward deformation of the seating 40 and extends into the portion of the passage 31 which extends through the shoulder 35. The outer face of the seating 40 is provided with a plurality of small, integral, discrete, deformable and collapsible resilient projections 42 upon which the ball 33 rests under gravity, the projections 42 acting physically to hold the ball 33 in its intermediate position defined above.

Since the radial distance between the bore 3 and the seating 40 is greater than in the construction of FIGS. 1 and 2, a second thrust ball 43 is disposed between the thrust ball 36 and the ball 33.

In the inoperative position of the master cylinder shown in FIG. 3 of the drawings the ball 33 of the transfer valve illustrated is held in its intermediate position by the projections 42.

When the master cylinder is operated on its own the ball 33 is moved away from the seating 40 and into a fully open position shown in FIG. 4. The pressure in the pressure space of that master cylinder is applied to the transfer valve of the other master cylinder which causes the projections to yield and permit the valve to cause it to close. As illustrated in FIG. 5 closure of a transfer valve in one master cylinder in response to pressure from the master cylinder acting on the ball 33 causes the projections 42 to collapse so that the ball can engage fully with the seating 40 thereby closing the valve.

Since rubber tends to be stiffer when cold, and fluid tends to be more viscous when cold, it follows that the flow required to close a transfer valve, that is the speed with which a pedal has to be depressed, remains substantially constant throughout the temperature range to which the system is subjected.

The construction and operation of master cylinder embodying the valves in FIGS. 3 to 5 is otherwise the same as that of FIGS. 1 and 2 and corresponding reference numerals have been applied to corresponding part.

In the constructions described above apertured retainers 50 are pressed into the passages 31 to retain the balls 33, 36, 43, within the passage 31 during transit.

Figure 6:
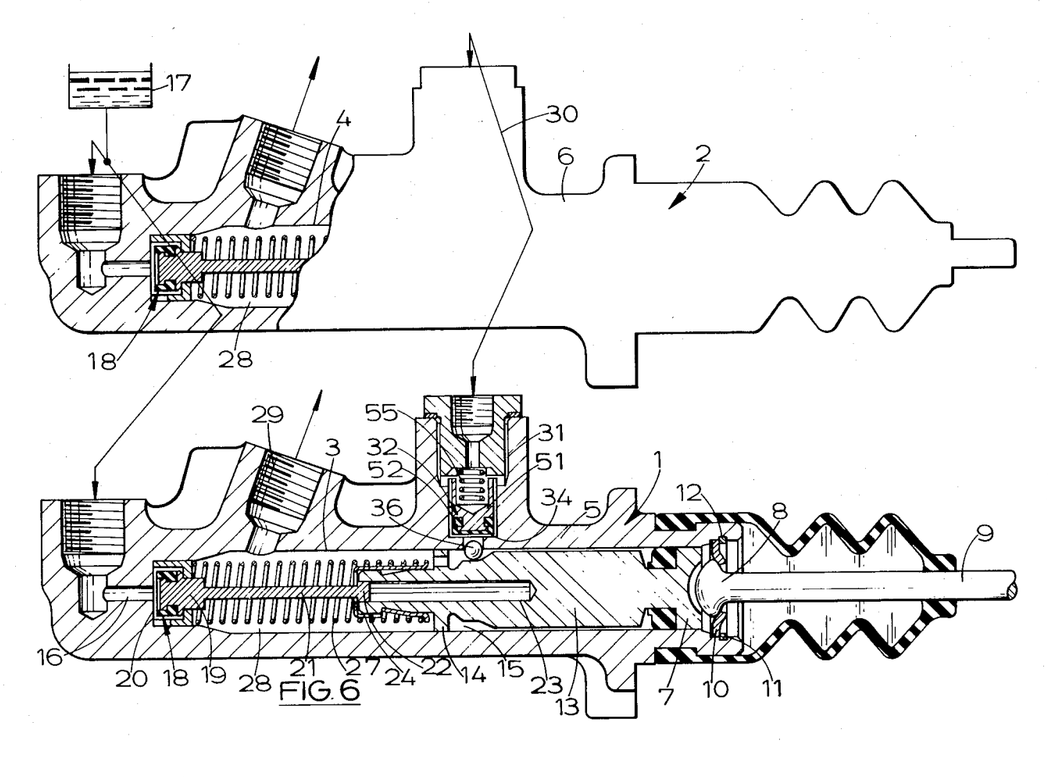
FIG. 6 is a part sectional side elevation of a dual master cylinder assembly.
Figure 7:
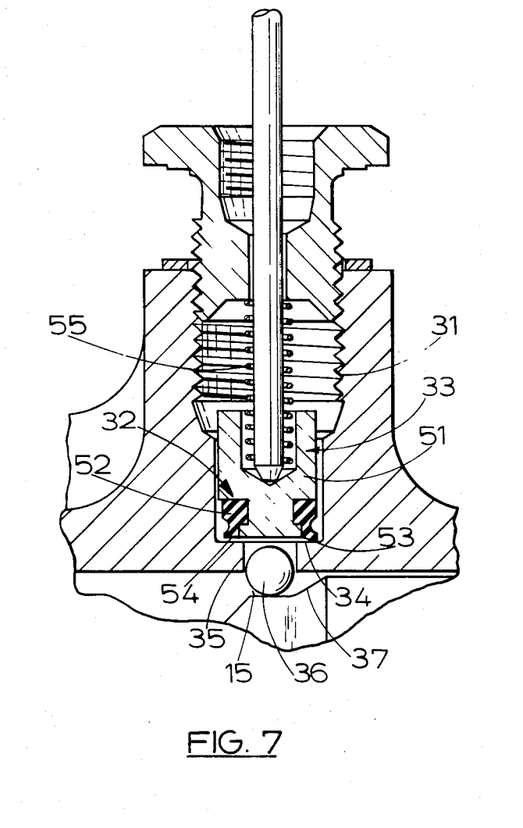
FIG. 7 is a section through a transfer valve of the assembly of FIG. 6.

The dual hydraulic master cylinder assembly illustrated in FIGS. 6 and 7 is similar in construction to the assembly described above with reference to FIG. 1 of the drawings with the exception of the construction of the transfer valves of the assembly. Therefore the assembly need not be herein described in detail, and corresponding reference numerals have been applied to corresponding parts.

In the modified transfer valve illustrated in FIGS. 6 and 7 of the drawings the valve member 33 comprises a piston 51 and a seal 52 of elastomeric material, suitably rubber, mounted on one end of the piston 51, the seal 52 being engageable with the seating 34 which is plain and which comprises a shoulder 35 at a step in diameter in the passage 31.

The seal 52 is provided with a plurality of integral, discrete, deformable, and collapsible resilient axially extending projections 53 on the circumference of its face 54 adjacent to the seating 34, and in a normal intermediate position the valve member is urged towards the seating 34 so that the projections 53 engage with the seating, the remainder of the face 54 of the seal 52 being held out of direct engagement with the seating 34 by the projections 53.

A spring 55 is provided in the passage 31 and acts on the piston 51 to urge the valve member towards the seating 34.

A thrust member 36 in the form of a ball is guided in a portion of the passage 31 surrounded by the shoulder 35 and the thrust member 36 is spaced from the seal 52 of the valve member and is received in a recess 15 between the piston 7 and the bore 3 of the master cylinder.

When one of the master cylinders, say the master cylinder 1, is operated a short forward movement of the piston 7 with corresponding compression of the spring 27 is sufficient to cause the projection to yield and the head 19 to engage with the seating 20 to isolate the reservoir 17 from the pressure space 28. Simultaneously, or almost immediately thereafter, the piston 7 also urges the thrust member 36 radially outwardly by the engagement therewith of an inclined annular face 37 at the end of the recess 15 remote from the flange 14. This movement urges the valve member away from the adjacent seating 34 and into a fully open position. Further movement of the piston 7 in the same direction causes fluid to flow through the transfer passage 30 through the open transfer valve which, in turn, creates a pressure drop across the valve member of the master cylinder 2, urging that valve member towards the adjacent seating 34 in the body 6. The resilient projections 53 on the seal 52 collapse so that the face 54 of the seal can engage fully with the seating 34 thereby closing the transfer valve 32 of the master cylinder 2 isolating the pressure spaces 28 of the master cylinders 1 and 2 from each other.

When the master cylinders are operated simultaneously the thrust members 36 both act in opposite directions to hold their respective valve members away from the seatings 34, so that the pressure spaces 28 are in free communication through the transfer passage 30 to compensate for differential wear of the linings of the brakes which the master cylinders 1 and 2 operate.

We claim:

1. A master cylinder assembly for a vehicle hydraulic braking system comprising first and second master cylinders adapted to be operated independently and simultaneously, each said master cylinder comprising a body having a longitudinal bore, a piston working in said bore and movable between a retracted position and an operative, advanced, position, a pressure space in said bore in advance of said piston for connection to a wheel brake, each said pressure space being pressurised when said respective master cylinder is operated to advance said piston in said bore and being unpressurised when said master cylinder is in an inoperative position with said piston in said retracted position, a transfer passage through which said pressure spaces are in communication when both said master cylinders are operated simultaneously, a first transfer valve located in said body of said first master cylinder between said transfer passage and said pressure space of said first master cylinder, and a second transfer valve located in said body of said second master cylinder between said transfer passage and said pressure space of said second master cylinder, said first transfer valve comprising a first valve seating in said body of said first master cylinder, and a first valve member engageable with said first valve seating and having a pressure-responsive face, and said second transfer valve comprising a second valve seating in said body of said second master cylinder and a second valve member engagable with said second valve seating and having a pressure-responsive face, each said transfer valve being movable between a fully closed position to prevent flow between said transfer passage and said pressure space and an intermediate position in which a limited flow can take place through said valve in both directions, and between said intermediate position and a fully open position, said valve member being urged into engagement with said seating in said fully closed position by pressure acting on said pressure-responsive face, said valve member being spaced from said seating by an amount sufficient to permit said limited flow in said intermediate position, and said valve member being spaced from said seating by an amount sufficient to permit an unrestricted flow through said valve in said fully open position, a first thrust member located between said piston of said first master cylinder and said first valve member of said first transfer valve, said first thrust member being spaced from said first valve member when said piston is in said retracted position but being adapted to co-operate with said first valve member to urge said first valve member positively away from said first valve seating to determine said fully open position of said first valve when said piston is urged into said operative, advanced, position, a second thrust member located between said piston of said second master cylinder and said second valve member of said second transfer valve, said second thrust member being spaced from said second valve member when said piston is in said retracted position but being adapted to co-operate with said second valve member to urge said second valve member positively away from said second valve seating to determine said fully open position of said second valve when said piston is urged into said operative, advanced, position, first yieldable means and second yieldable means for holding said first valve and said second valve respectively in said intermediate positions at least when both said master cylinders are in said inoperative positions, operation of one of said master cylinders on its own causing the valve member of said respective transfer valve thereof to open fully and the pressure generated in said pressure space of the said one master cylinder to act through said transfer passage to urge the valve member of said transfer valve of the other of said master cylinders into said fully closed position against said yieldable means by said pressure acting on said pressure-responsive face of said valve member, thereby isolating said transfer passage from said pressure space of said other, then inoperative, master cylinder, whereby said pressure space of the said one master cylinder can be pressurised with no fluid being transferred to the said other master cylinder, and simultaneous operation of both said master cylinders causing both said transfer valves to move into said fully open positions by co-operation of said first and second thrust members with said first and second valve members respectively, whereby both said pressure spaces are placed in open communication through said transfer passage.

2. A master cylinder assembly as claimed in claim 1, wherein each said first and second valve member comprises an unsprung valve member which is urged towards said first and second respective seating under gravity when said master cylinder is in said inoperative position.

3. A master cylinder assembly as claimed in claim 1, wherein a first spring is provided in said transfer passage for urging said first valve member towards said first seating, and a second spring is provided in said transfer passage for urging said second valve member towards said second seating.

4. A master cylinder assembly as claimed in claim 2 wherein the yieldable means holding each said valve member in its intermediate position away from said seating when the master cylinder is in said inoperative position, comprises only the thickness of a film of hydraulic fluid between said valve element and said seating.

5. A master cylinder assembly as claimed in claim 1 wherein the yieldable means holding each said valve member in its intermediate position away from said seating comprises discrete resilient projections between said valve member and its seating which are deformable to enable said valve member to engage fully with said seating when said valve member is subjected to pressure of fluid in said pressure space of the other of said master cylinders when it is operated on its own.

6. A master cylinder assembly as claimed in claim 5, wherein said seating is constructed from an elastomeric material and said projections are integral with said seating.

7. A master cylinder assembly as claimed in claim 5, wherein said seating is plain and said yieldable means comprises discrete resilient projections provided on said valve member itself.

8. A master cylinder assembly for a vehicle hydraulic braking system comprising first and second master cylinders adapted to be operated independently and simultaneously, each of said master cylinder comprising a body having a longitudinal bore, a piston working in said bore and movable between a retracted position and an operative, advanced position, a pressure space in said bore in advance of said piston for connection to a wheel brake, each said pressure space being pressurised when said respective master cylinder is operated to advance said piston in said bore and being unpressurized when said master cylinder is in an inoperative position with said piston in said retracted position, a transfer passage through which said pressure spaces are in communication when both said master cylinders are operated simultaneously, a first transfer valve located in said body of said first master cylinder between said transfer passage and said pressure space of said first master cylinder, and a second transfer valve located in said body of said second master cylinder between said transfer passage and said pressure space of said second master cylinder, said frst transfer valve comprising a first valve seating in said body of said first master cylinder, and a first valve member engagable with said first valve seating and having a pressure-responsive face, and said second transfer valve comprising a second valve seating in said body of said second master cylinder and a second valve member engagable with said second valve seating and having a pressure-responsive face, each said transfer valve being movable between a fully closed position to prevent flow between said transfer passage and said pressure space and an intermediate position in which a limited flow can take place through said valve in both directions, and between said intermediate position and a fully open position, said valve member being urged into engagement with said seating in said fully closed position by pressure acting on said pressure-responsive face, said valve member being spaced from said seating by an amount sufficient to permit said limited flow in said intermediate position, and said valve member being spaced from said seating by an amount sufficient to permit an unrestricted flow through said valve in said fully open position, a first thrust member located between said piston of said first master cylinder and said first valve member of said first transfer valve, said first thrust member being spaced from said first valve member when said piston is in said retracted position but being adapted to co-operate with said first valve member to urge said first valve member positively away from said first valve seating to determine said fully open position of said first valve when said piston is urged into said operative, advanced, position, a second thrust member located between said piston of said second master cylinder and said second valve member of said second transfer valve, said second thrust member being spaced from said second valve member when said piston is in said retracted position but being adapted to co-operate with said second valve member to urge said scond valve member positively away from said second valve seating to determine said fully open position of said second valve when said piston is urged into said operative, advanced, position, first means and second means for holding said first valve and said second valve respectively in said intermediate positions at least when both said master cylinders are in said inoperative positions, operation of one of said master cylinders on its own causing the valve member of said respective transfer valve thereof to open fully and the pressure generated in said pressure space of the said one master cylinder to act through said transfer passage to urge the valve member of said transfer valve of the other of said master cylinders into said fully closed position by said pressure acting on said pressure-responsive face of said valve member, thereby isolating said transfer passage from said pressure space of said other, then inoperative, master cylinder, whereby said pressure space of the said one master cylinder can be pressurised with no fluid being transferred to the said other master cylinder, and simultaneous operation of both said master cylinders causing both said transfer valves to move into said fully open positions by co-operation of said first and second thrust members with said first and second valve members respectively, whereby both said pressure spaces are placed in open communication through said transfer passage, said master cylinder assembly including a first spring in said transfer passage for urging said first valve member towards said first seating, and a second spring in said transfer passage for urging said second valve member towards said second seating, each said valve member being held from its seating by discrete resilient projections which are deformable to enable said valve member to engage fully with said seating when said valve member is subjected to pressure of fluid in said pressure space of the other one of said master cylinders when that master cylinder is operated on its own.

9. A master cylinder assembly as claimed in claim 8 wherein said seating is constructed from an elastomeric material and said projections are integral with said seating.

10. A master cylinder assembly as claimed in claim 8, wherein said seating is plain and said yieldable means comprises discrete resilient projections provided on said valve member itself.

11. A master cylinder assembly as claimed in claim 10, in which a seal is provided on the valve member adjacent to the seating, and the resilient projections are integral with the seal.

12. A master cylinder assembly as claimed in claim 11, in which the seal is constructed from an elastomeric material.

* * * * *